(12) United States Patent
Wu et al.

(10) Patent No.: US 9,529,926 B2
(45) Date of Patent: Dec. 27, 2016

(54) SNAPSHOT REFRESHMENT FOR SEARCH RESULTS PAGE PREVIEW

(75) Inventors: Hui Wu, Fremont, CA (US);
Zhongqiang Chen, San Jose, CA (US);
Shenhong Zhu, Santa Clara, CA (US);
Xiaobing Han, San Jose, CA (US);
Hang Su, Sunnyvale, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 329 days.

(21) Appl. No.: 13/453,007

(22) Filed: Apr. 23, 2012

(65) Prior Publication Data
US 2013/0283137 A1    Oct. 24, 2013

(51) Int. Cl.
*G06F 17/00*    (2006.01)
*G06F 17/30*    (2006.01)

(52) U.S. Cl.
CPC ............... *G06F 17/30876* (2013.01)

(58) Field of Classification Search
CPC .............. G06F 17/30876; G06F 17/30864
USPC ................................. 715/205, 207
See application file for complete search history.

(56) References Cited

U.S. PATENT DOCUMENTS

| | | | | |
|---|---|---|---|---|
| 6,643,641 B1 * | 11/2003 | Snyder | .......... | 707/709 |
| 7,346,842 B1 * | 3/2008 | Hayton et al. | ........ | 715/234 |
| 7,412,650 B2 * | 8/2008 | Gallo | .......... | 715/700 |
| 7,657,571 B2 * | 2/2010 | Battagin et al. | ........ | 715/744 |
| RE42,413 E * | 5/2011 | Snyder | .......... | 707/802 |
| 7,996,395 B2 * | 8/2011 | Li et al. | ........ | 707/723 |
| 8,250,067 B2 * | 8/2012 | Li et al. | ........ | 707/723 |
| 8,495,218 B1 * | 7/2013 | Shao et al. | ........ | 709/226 |
| 8,538,943 B1 * | 9/2013 | Bau et al. | ........ | 707/706 |
| 2002/0163546 A1 * | 11/2002 | Gallo | .......... | 345/848 |
| 2005/0262231 A1 * | 11/2005 | Lowe et al. | ........ | 709/223 |
| 2006/0265417 A1 * | 11/2006 | Amato et al. | ........ | 707/102 |
| 2007/0050416 A1 * | 3/2007 | Battagin et al. | ........ | 707/200 |
| 2007/0250468 A1 * | 10/2007 | Pieper | .......... | 707/1 |
| 2007/0288589 A1 * | 12/2007 | Chen et al. | ........ | 709/217 |
| 2008/0104256 A1 * | 5/2008 | Olston | ........ | 709/228 |
| 2008/0104257 A1 * | 5/2008 | Olston | ........ | 709/228 |
| 2008/0104502 A1 * | 5/2008 | Olston | ........ | 715/229 |
| 2008/0184129 A1 * | 7/2008 | Cancel et al. | ........ | 715/741 |
| 2008/0222273 A1 * | 9/2008 | Lakshmanan et al. | ....... | 709/219 |
| 2008/0256051 A1 * | 10/2008 | Liu et al. | .......... | 707/5 |
| 2009/0070306 A1 * | 3/2009 | Stroe et al. | ........ | 707/4 |
| 2010/0036878 A1 * | 2/2010 | Kim | .......... | 707/104.1 |
| 2010/0223257 A1 * | 9/2010 | Milic-Frayling et al. | .... | 707/722 |
| 2010/0332513 A1 * | 12/2010 | Azar et al. | ........ | 707/769 |
| 2011/0317022 A1 * | 12/2011 | Cao | .......... | 348/207.11 |
| 2012/0076414 A1 * | 3/2012 | Xu et al. | ........ | 382/176 |
| 2012/0131441 A1 * | 5/2012 | Jitkoff et al. | ........ | 715/234 |

(Continued)

*Primary Examiner* — Stephen Hong
*Assistant Examiner* — Marshon Robinson
(74) *Attorney, Agent, or Firm* — Pillsbury Winthrop Shaw Pittman LLP

(57) ABSTRACT

Methods, systems, and programming for refreshing web page URL snapshots are disclosed. A plurality of URLs is received. URLs from the plurality of URLs are selected to schedule for refreshment of snapshots corresponding to web pages associated with the URLs. A plurality of snapshots is generated, each snapshot associated with a corresponding URL of the selected URLs scheduled for refreshment. The plurality of snapshots is provided for display, wherein each snapshot is a viewable and actionable link to the corresponding URL the snapshot is associated with.

19 Claims, 16 Drawing Sheets

(56) References Cited

U.S. PATENT DOCUMENTS

| | | | |
|---|---|---|---|
| 2012/0136756 A1* | 5/2012 | Jitkoff et al. | 705/27.1 |
| 2012/0233530 A1* | 9/2012 | Stroe et al. | 715/205 |
| 2012/0284597 A1* | 11/2012 | Burkard et al. | 715/205 |
| 2013/0018912 A1* | 1/2013 | Bao et al. | 707/769 |
| 2013/0124968 A1* | 5/2013 | Dontcheva et al. | 715/234 |
| 2013/0144861 A1* | 6/2013 | Bennett | 707/710 |
| 2013/0159826 A1* | 6/2013 | Mason et al. | 715/205 |
| 2013/0239212 A1* | 9/2013 | Bennett | 726/22 |

* cited by examiner

SNAPSHOT REFRESHMENT FOR SEARCH RESULTS PAGE PREVIEW

FIELD

The present disclosure relates to methods, systems and programming for continuously refreshing web page snapshots. More particularly, the present disclosure is directed to methods, systems, and programming for continuously refreshing high quality web page snapshots to provide the high quality web page snapshots as search results.

BACKGROUND OF THE INVENTION

When users of web search engines or browsers enter search requests, snapshots corresponding to the web pages of the search requests may be produced. However, it is often the case that the snapshots do not offer useful information and do not reflect the contents of the original web pages. In certain circumstances, the snapshots themselves may be low quality images or simply snapshots of error pages due to certain web pages being removed, or being under maintenance. Thus, when users view these results, they may not see results that produce web pages that can be navigated to for useful information. Additionally, users may need to spend time sifting through results to find results with snapshots that are useable and offer useful information.

If high quality snapshots are acquired, there is still the problem of users wanting to be sure that they are viewing refreshed snapshots. For example, a user may select a snapshot, but find that the web page being viewed is not properly represented by the snapshot. Thus, it would be beneficial for users to view snapshots of web pages that accurately reflect their associated web pages. As a result, management of web page snapshots with respect to providing search results is an important consideration to provide users with a seamless web search experience.

SUMMARY

The embodiments described herein relate to methods, systems, and programming for continuously refreshing web page snapshots. More particularly, the present disclosure is directed to methods, systems, and programming for continuously refreshing high quality web page snapshots to provide the high quality web page snapshots as search results.

In an embodiment a method implemented on at least one computing device, each computing device having at least one processor, storage, and a communication platform connected to a network for refreshing web page snapshots, is disclosed. A plurality of URLs is received. URLs from the plurality of URLs are selected to schedule for refreshment. A plurality of snapshots is generated, each snapshot associated with a corresponding URL of the selected URLs scheduled for refreshment. The plurality of snapshots are provided for display, wherein each snapshot is a viewable and actionable link to the corresponding URL the snapshot is associated with.

In another embodiment, receiving a plurality of URLs comprises: receiving a first set of URLs, the first set of URLs representing URLs that have associated snapshots; and receiving a second set of URLs, the second set of URLs being newly inputted URLs without associated snapshots.

In another embodiment, selecting URLs from the plurality of URLs to schedule for refreshment comprises: analyzing attributes of each of the plurality of URLs; assigning an importance score to each of the plurality of URLs based on analyzing the attributes of each of the plurality of URLs; and selecting a set of URLs for refreshment from the plurality of URLs for refreshment based on the importance scores. The set of URLs scheduled for refreshment may be stored in a URL repository. A different set of URLs not selected for refreshment may be stored in a failed URL repository. Snapshots corresponding to each of the URLs from the different set of URLs not selected for refreshment may be deleted from a snapshot repository.

In another embodiment, generating a plurality of snapshots, each snapshot associated with a corresponding URL of the selected plurality of URLs scheduled for refreshment comprises: for each of the selected URLs scheduled for refreshment, determining if the URL is associated with a failure condition; generating a snapshot of the URL if the URL is not associated with a failure condition; determining whether the snapshot is a high quality snapshot; and storing the snapshot in a snapshot repository in response to determining that the snapshot is a high quality snapshot. The URL is stored in a failed URL repository if the URL is associated with a failure condition when its snapshot is generated. The URL is stored in the failed URL repository in response to determining that the snapshot is not a high quality snapshot.

In an embodiment a method implemented on at least one computing device, each computing device having at least one processor, storage, and a communication platform connected to a network for providing refreshed web page URL snapshots, is disclosed. A search request is received. A list of search results corresponding to the search request is identified. A plurality of snapshots is retrieved, wherein each snapshot is associated with a corresponding search result, and wherein the snapshots are high quality snapshots that are periodically refreshed. The snapshots are provided for display as viewable and actionable links corresponding to search results, wherein each search result represents a URL.

In an embodiment, a system providing web page snapshots is disclosed. The system includes a refreshment scheduler for selecting URLs from a plurality of URLs to schedule for refreshment; a snapshot generator for generating a plurality of snapshots, each snapshot associated with a corresponding URL of the selected URLs scheduled for refreshment; and a snapshot repository for storing and providing the plurality of snapshots for display, wherein each snapshot is a viewable and actionable link to the corresponding URL the snapshot is associated with.

In another embodiment, the refreshment schedule is configured for receiving a first set of URLs, the first set of URLs representing URLs that have associated snapshots; and receiving a second set of URLs, the second set of URLs being newly inputted URLs without associated snapshots.

In another embodiment, the refreshment scheduler is further configured for analyzing attributes of each of the plurality of URLs; assigning an importance score to each of the plurality of URLs based on analyzing the attributes of each of the plurality of URLs; and selecting a set of URLs for refreshment from the plurality of URLs for refreshment based on the importance scores. The system may further include a URL repository for storing the set of URLs scheduled for refreshment; and a failed URL repository for storing a different set of URLs whose snapshots can not be generated or are in low quality. The refreshment schedule may further be configured for deleting snapshots and their corresponding URLs from the different set of URLs in URL repository and failed URL repository if such URLs are obsolete in search engine's indices.

In another embodiment, the snapshot generator is configured to: for each of the selected URLs scheduled for refreshment, determine if the URL is associated with a failure condition; generate a snapshot of the URL if the URL is not associated with a failure condition; determine whether the snapshot is a high quality snapshot; and store the snapshot in a snapshot repository in response to determining that the snapshot is a high quality snapshot.

Other concepts relate to software for implementing adaptive application searching. A software product, in accord with this concept, includes at least one machine-readable non-transitory medium and information carried by the medium. The information carried by the medium may be executable program code data regarding parameters in association with a request or operational parameters.

In an embodiment, a machine readable and non-transitory medium having information recorded thereon for providing web page snapshots, where when the information is read by the machine, causes the machine to receive a plurality of URLs, select URLs from the plurality of URLs to schedule for refreshment, generate a plurality of snapshots, each snapshot associated with a corresponding URL of the selected URLs scheduled for refreshment, and provide the plurality of snapshots for display, wherein each snapshot is a viewable and actionable link to the corresponding URL the snapshot is associated with.

In another embodiment, receiving a plurality of URLs comprises: receiving a first set of URLs, the first set of URLs that have associated snapshots; and receiving a second set of URLs, the second set of URLs being newly inputted URLs without associated snapshots.

In another embodiment, selecting URLs from the plurality of URLs to schedule for refreshment comprises: analyzing attributes of each of the plurality of URLs; assigning an importance score to each of the plurality of URLs based on analyzing the attributes of each of the plurality of URLs; and selecting a set of URLs for refreshment from the plurality of URLs for refreshment based on the importance scores. The set of URLs scheduled for refreshment may be stored in a URL repository. A different set of URLs not selected for refreshment may be stored in a failed URL repository. Snapshots corresponding to each of the URLs from the different set of URLs not selected for refreshment may be deleted from a snapshot repository.

In another embodiment, generating a plurality of snapshots, each snapshot associated with a corresponding URL of the selected plurality of URLs scheduled for refreshment comprises: for each of the selected URLs scheduled for refreshment: determining if the URL is associated with a failure condition; generating a snapshot of the URL if the URL is not associated with a failure condition; determining whether the snapshot is a high quality snapshot; and storing the snapshot in a snapshot repository in response to determining that the snapshot is a high quality snapshot. The URL is stored in a failed URL repository if the URL is associated with a failure condition. The URL is stored in the failed URL repository in response to determining that the snapshot is not a high quality snapshot.

Additional advantages and novel features will be set forth in part in the description which follows, and in part will become apparent to those skilled in the art upon examination of the following and the accompanying drawings or may be learned by production or operation of the disclosed embodiments. The advantages of the present embodiments may be realized and attained by practice or use of various aspects of the methodologies, instrumentalities and combinations set forth in the detailed description set forth below.

DETAILED DESCRIPTION

In the following detailed description, numerous specific details are set forth by way of example in order to provide a thorough understanding of the relevant embodiments described herein. However, it should be apparent to those skilled in the art that the present embodiments may be practiced without such details. In other instances, well known methods, procedures, components and/or circuitry have been described at a relatively high-level, without detail, in order to avoid unnecessarily obscuring aspects of the embodiments described herein.

The present disclosure relates to methods, systems and programming for continuously refreshing web page snapshots. More particularly, the present disclosure is directed to methods, systems, and programming for continuously refreshing high quality web page snapshots to provide the high quality web page snapshots as search results. In order to ensure that search results using web page snapshots are useful to users, not only should the web page snapshots be of high quality to represent the web pages to which they correspond, but the web page snapshots themselves should also be refreshed continuously so that the web page snapshots always reflect a direct representation of what is displayed when visiting a particular web page URL. Thus, continuously generating web page snapshots under practical constraints is described with respect to the embodiments of the present disclosure. Different URLs may be classified and scheduled for refreshment accordingly. Once scheduled for refreshment, high quality snapshots of these URLs are generated and used as search results.

Web page snapshot quality may be evaluated in order to ensure that high quality web page snapshots are provided to users for viewing based on their search results. This ensures that users are offered useful information in the snapshots and that the snapshots reflect the current content of the web page URLs to which they correspond. As the web pages snapshots are continuously refreshed, this ensures that the snapshots are always identical in content to what is actually displayed if a user were to navigate to the corresponding web page. The web page snapshots are also actionable since each snapshot links to a corresponding web page URL. In classifying whether a web page snapshot is high quality, classification techniques are used to extract features of web pages, taking into account Hypertext Transfer Protocol (HTTP) responses, web page source code, and snapshot color distribution. A method to schedule refreshment of snapshots is also used to ensure that snapshots are refreshed or generated in an efficient manner.

Figure 1:
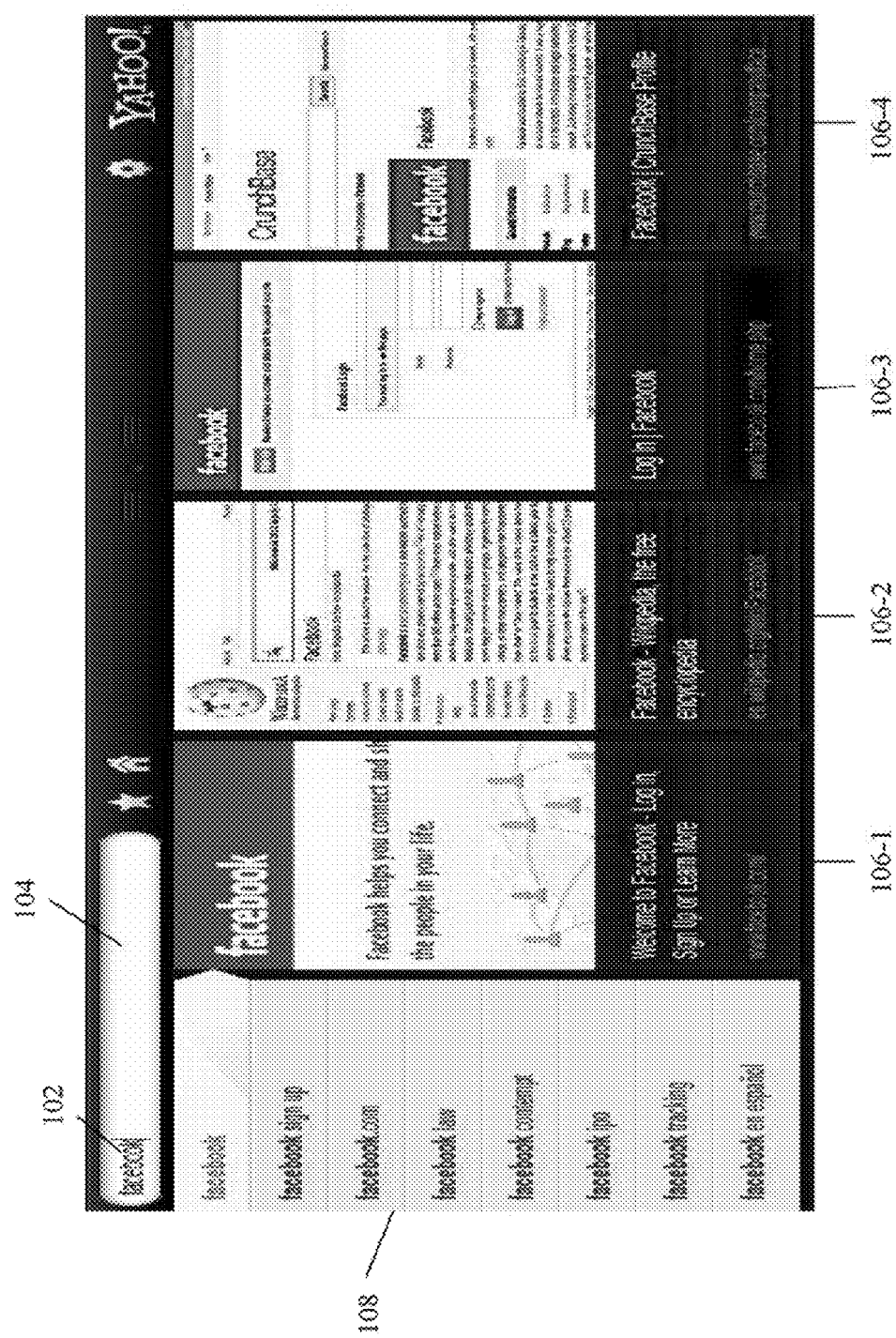
FIG. 1 depicts an exemplary view of search results including web page snapshots, in accordance with an embodiment of the present disclosure.

FIG. 1 depicts an exemplary view of search results including web page snapshots, in accordance with an embodiment of the present disclosure. A search query 102 is entered into search query box 104. The search query "facebook" has resulted in snapshots 106-1-106-4 appearing in the search results 108. Search results 108 may be shown in an entire browser window, or may comprise a preview of search results that only consumes a portion of a browser window. Each snapshot 106-1-106-4 represents a different search result corresponding to search query 102. Each snapshot 106-1-106-4 is viewable to show a web page, and also actionable to link a browser to a web page uniform resource locator (URL) corresponding to the snapshot. For example, if snapshot 106-1 is selected, clicked, or activated, this will cause a browser environment or other platform or program capable of viewing a web site to navigate to "www.facebook.com" which is the web page URL corresponding to snapshot 106-1. Providing users the ability to view the snapshots as results of a search query allows users to quickly and visually device, based on the snapshots of web pages, which results may be most relevant to their entered search query. Snapshots 106-1-106-4 are also displayed because they have been deemed high quality snapshots. Snapshots 106-1-106-4 are also refreshed at predetermined times to ensure that they always offer an accurate reflection of what the actual web page display looks like for any given associated web page URL. Also included is a query suggestion box 108. Query suggestion box suggests other relevant queries based on the search query 102 entered into search query box 104. Additionally, as search query 102 is updated, either by deletion or addition of text, query suggestion box 108 and snapshots 106-1-106-4 may update in real time in response to the change in search query 102.

Figure 2:
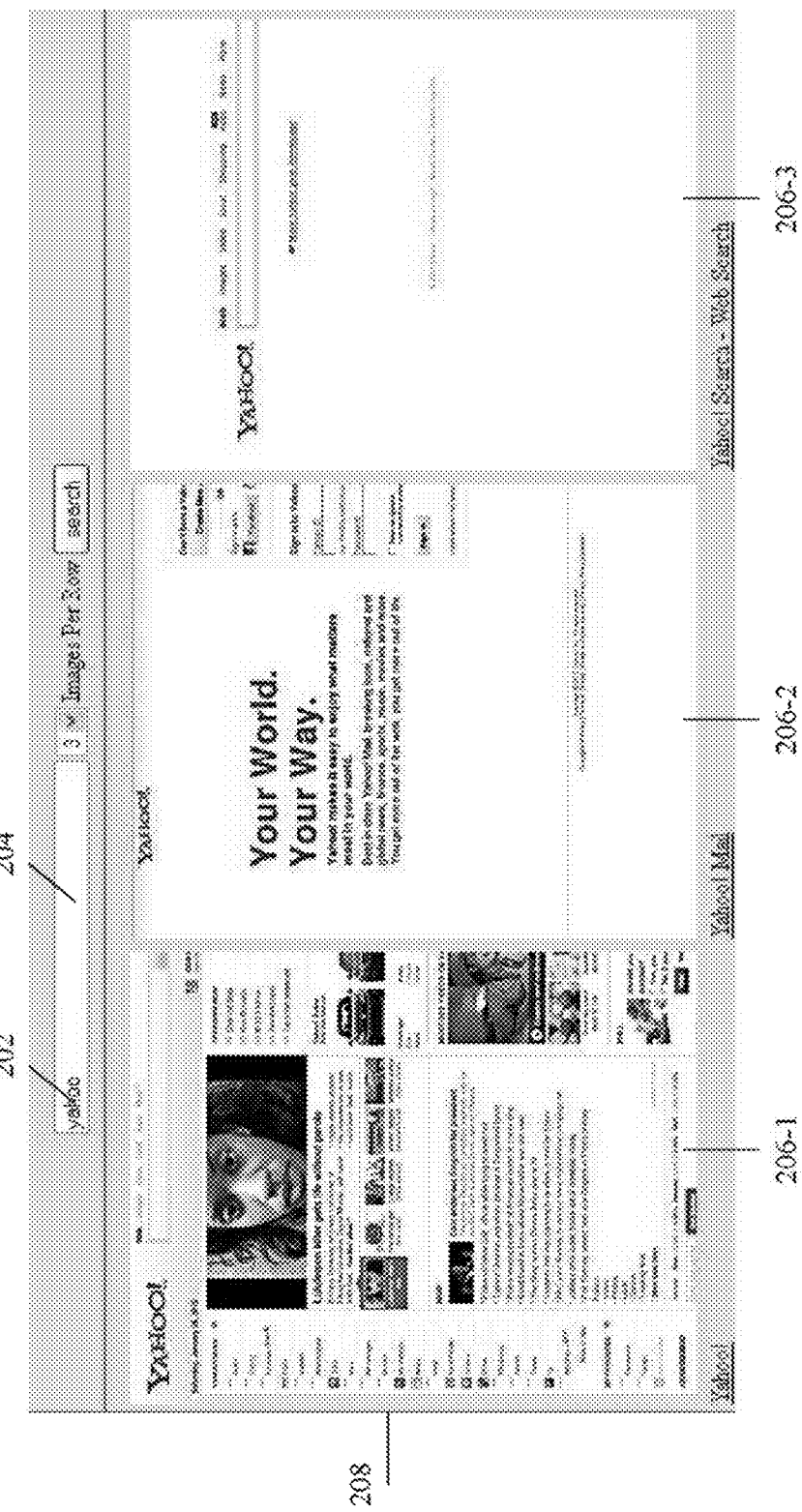
FIG. 2 depicts an exemplary view of search results provided by a snapshot-based search engine, in accordance with an embodiment of the present disclosure.

FIG. 2 depicts an exemplary view of a search results provided by a snapshot-based search engine, in accordance with an embodiment of the present disclosure. A search query 202 is entered into search query box 204. The search query 202 entitled "yahoo" has resulted in snapshots 206-1-206-3 appearing in the search results 208. Search results 208 may be shown in an entire browser window, or may comprise a preview of search results that only consumes a portion of a browser window. Each snapshot 206-1-206-3 represents a different snapshot corresponding to search query 202. Each snapshot 206-1-206-3 is viewable to show a web page, and also actionable to link a browser to a web page uniform resource locator (URL) corresponding to the snapshot. Each snapshot represents a high quality snapshot that has been continuously refreshed and provided as a search result.

Figure 3:
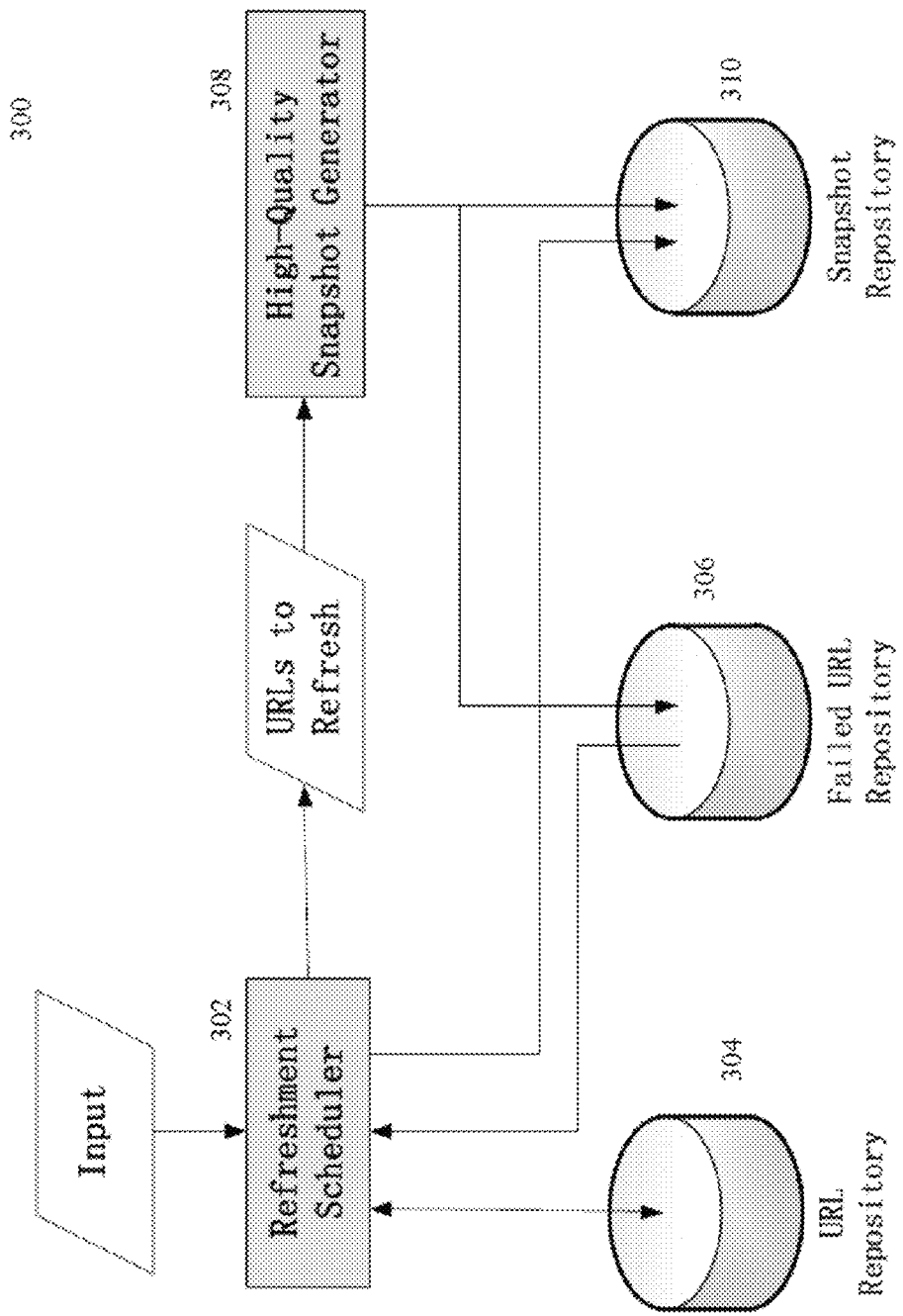
FIG. 3 depicts a high level exemplary system diagram of a system for providing refreshed high quality web page snapshots in accordance with an embodiment of the present disclosure.

FIG. 3 depicts a high level exemplary system diagram of a system for providing refreshed high quality web page snapshots in accordance with an embodiment of the present disclosure. The system 300 shown by FIG. 3 may be implemented as a stand-alone system for refreshment and generation of snapshots, or may be implemented on the back-end of a search engine or other type of web server. System 300 receives web page URLs as input. These web page URLs are URLs that are new to the URL Repository 304 and require snapshots to be generated, or they may be web page URLs which already have associated snapshots which require refreshing or updating. This input is received by refreshment scheduler 302. The web page URLs which are already associated with snapshots but require refreshing or updating are provided to refreshment scheduler 302 by URL repository 304. Refreshment scheduler 302 analyzes the received input URLs and schedules refreshment of the URLs by analyzing URL attributes, assigning importance scores to each URL, and selecting which URLs should be refreshed. Input is received at refreshment scheduler 302 at predetermined intervals.

In another embodiment, refreshment scheduler 302 may also receive as input, URLs from failed URL repository 306. Failed URL repository 306 stores a list of URLs that were scheduled for refreshment, but had errors associated with generation of snapshots corresponding to the URLs. The re-input of URLs from failed URL repository 306 allows refreshment scheduler 302 a chance to reevaluate these URLs and determine if they could be eligible for generation of a refreshed snapshot.

Refreshment scheduler 302 analyzes each input URL and determines certain URL attributes of the URLs including whether the URL is new, how many times a URL has been clicked or accessed, whether the URL is a recently failed URL, and whether snapshot generation was previously successful for the URL. These attributes are used to assign an importance score to each URL. For example, a URL that is new is given a high importance score since there is no snapshot associated with a new URL. Similarly, a URL that is clicked or accessed very often should be assigned a high importance score due to the amount of traffic to the URL, it is likely that the URL would appear often in search results.

On the contrary, if a particular URL has not been clicked or accessed for a long period of time, then this URL should be assigned a low importance score. Based on the importance scores assigned to the URLs, refreshment scheduler 302 selects URLs, which have an associated importance score higher than an importance score threshold, to be refreshed. Refreshment scheduler 302 sends back the remaining URLs to either URL repository 304 or failed URL repository 306.

The URLs selected for refreshment by refreshment scheduler 302 are forwarded to high quality snapshot generator 308. High quality snapshot generator 308 receives as input the selected URLs for snapshot generation. The URLs represent web page URLs for which high quality snapshot generator 308 will attempt to generate snapshots. Of the generated snapshots, high quality snapshot generator 308 will select the snapshots that pass a threshold test and mark them as high quality snapshots. The high quality snapshots are output by high quality snapshot generator 308 and may be stored for retrieval as search results when needed. The successfully generated snapshots that are deemed high quality snapshots are sent to snapshot repository 310 for storage. These snapshots in snapshot repository 310 may be retrieved and provided as viewable and actionable search results that link to corresponding web page URLs. The URLs whose snapshots could not be generated and the URLs whose snapshots were not in high quality are transmitted to failed URL repository 306 for storage. These URLs, as mentioned above, may be re-input to refreshment scheduler 302 to reattempt snapshot generation and refreshment.

Figure 4:
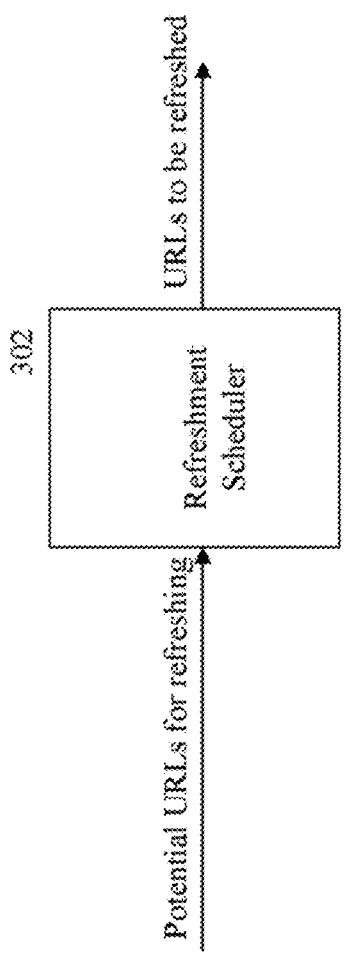
FIG. 4 depicts inputs and outputs of a refreshment scheduler in accordance with an embodiment of the present disclosure.

FIG. 4 depicts inputs and outputs of a refreshment scheduler in accordance with an embodiment of the present disclosure. Refreshment scheduler 302 receives as input a plurality of URLs that require refreshed snapshots. The input may be new URLs, URLs which have snapshots associated with them, URLs which encountered problems during previous snapshot generation attempts, and URLs which were not scheduled for refreshment previously. Refreshment scheduler 302 analyzes attributes of each URL, assigns an importance score to each URL, and based on the importance score, determines which URLs should be scheduled for refreshment. Refreshment scheduler outputs the URLs to be refreshed and transmits them to high quality snapshot generator 308 to generate snapshots of the web pages corresponding to the URLs.

Figure 5:
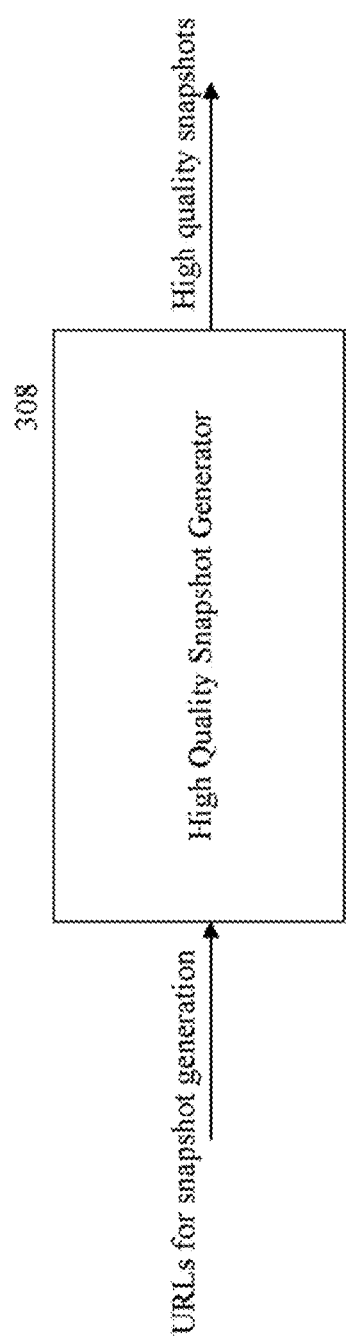
FIG. 5 depicts inputs and outputs of a high quality snapshot generator in accordance to an embodiment of the present disclosure.

FIG. 5 depicts inputs and outputs of a high quality snapshot generator in accordance to an embodiment of the present disclosure. High quality snapshot generator 308 receives as input the selected plurality of URLs for refreshment from refreshment scheduler 302. High quality snapshot generator 308 fetches contents of each URL from the corresponding web servers, and then processes each URL to first determine if it is associated with an error or failure condition. Of the URLs which do not have an error or failure condition associated with them, high quality snapshot generator 308 creates their snapshots. High quality snapshot generator 308 then uses a classification model to extract features from each of the generated snapshots in order to determine which of the generated snapshots may be deemed high quality. The high quality snapshots are output from high quality snapshot generator 308 for storage in snapshot repository 310. These snapshots in snapshot repository 310 may be retrieved and provided as viewable and actionable search results that link to corresponding web page URLs.

Figure 6:
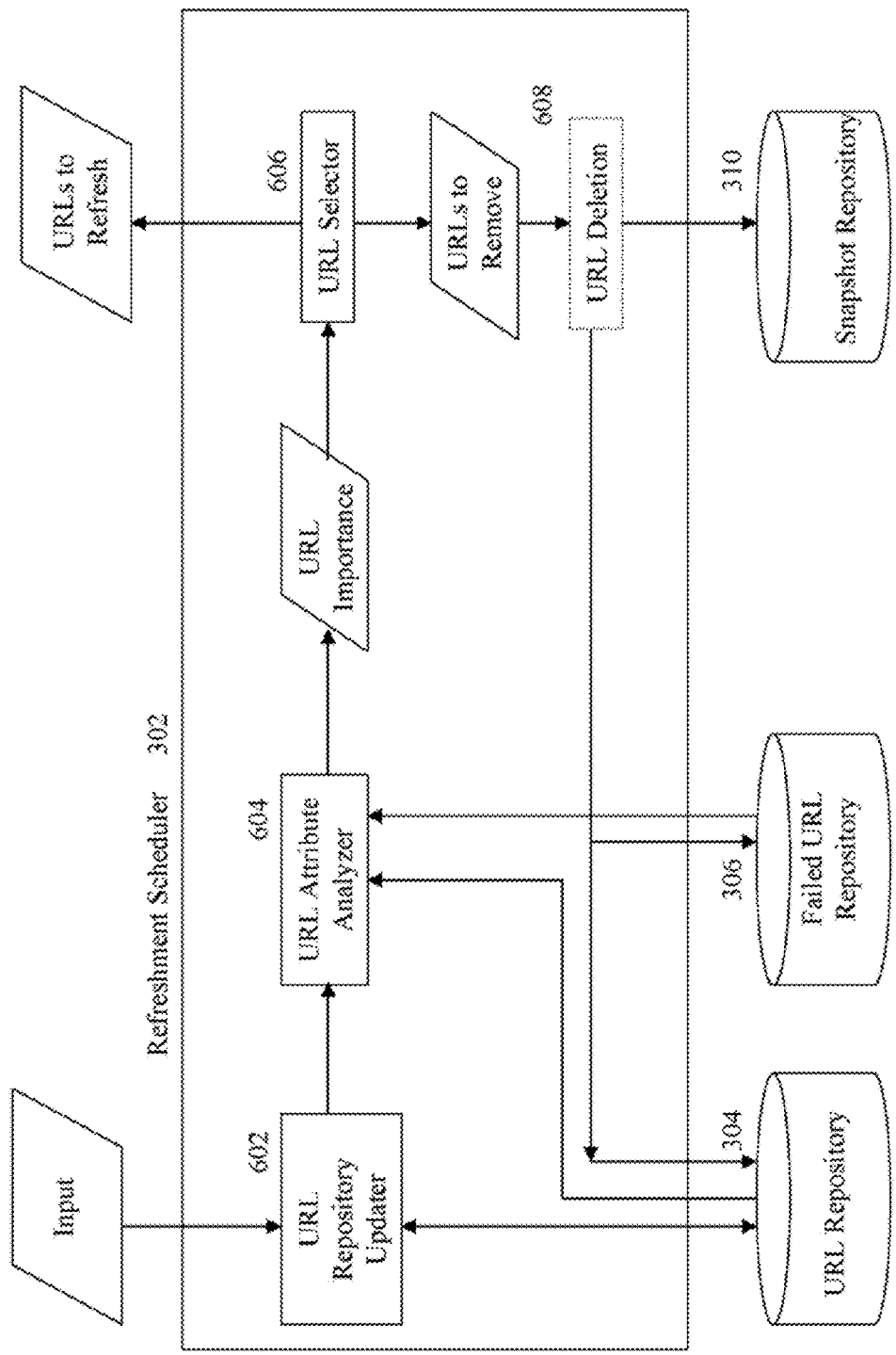
FIG. 6 depicts a high level exemplary system diagram of a refreshment scheduler in accordance with an embodiment of the present disclosure.

FIG. 6 depicts a high level exemplary system diagram of a refreshment scheduler in accordance with an embodiment of the present disclosure. Refreshment scheduler 302 receives as input a plurality of URLs that require refreshed snapshots. The input may be new URLs, URLs which have snapshots associated with them, URLs which encountered problems during previous snapshot generation attempts, and URLs which were not scheduled for refreshment previously. This input is received by URL Repository Updater 602 which is responsible for updating URL Repository 304. All input URLs are provided to URL attribute analyzer 604 to analyze attributes associated with each URL and assign an importance score to each URL. Calculation of an importance score can be based on an algorithm taking into account various factors, including: whether the URLs are new URLs, URLs which have snapshots associated with them, URLs which encountered problems during previous snapshot generation attempts, and URLs which were not scheduled for refreshment previously. Certain previously failed URLs from failed URL repository 306 may also be input to URL attribute analyzer for reanalysis. Certain failed URLs may no longer be suffering from the errors or conditions that caused them to fail previously, and may now be eligible for snapshot refreshment or generation.

The URLs and their associated importance scores are transmitted to URL Selector 606 which compares each URL's importance score with an importance score threshold. All URLs having an importance score higher than or equal to the importance score threshold are selected for refreshment. All URLs that are obsolete in search engine indexes are flagged for removal. Meanwhile, URLs having an importance score lower than the importance score threshold are returned to either URL Repository or failed URL Repository. The URLs selected for refreshment are transmitted to high quality snapshot generator 308 for generation of snapshots that may be used to furnish search results in the form of snapshots that are viewable and actionable by a user of a user device. The URLs flagged for removal are deleted from either URL repository 304 or failed URL repository 306 based on an instruction from URL Selector 606. Any snapshots corresponding to the URLs flagged for removal are deleted from snapshot repository 310 based on an instruction to snapshot repository 310 sent from URL Selector 606.

In an embodiment, refreshment scheduler 302 periodically or at predetermined times receives new input URLs in order to continuously schedule URLs for snapshot generation or refreshment. This ensures that refreshment scheduler 302 is utilized efficiently to continuously provide updated lists of URLs selected for refreshment so that high quality snapshot generator 308 can continuously generate high quality snapshots of web pages which may be delivered as search results corresponding to web page URLs.

Figure 7:
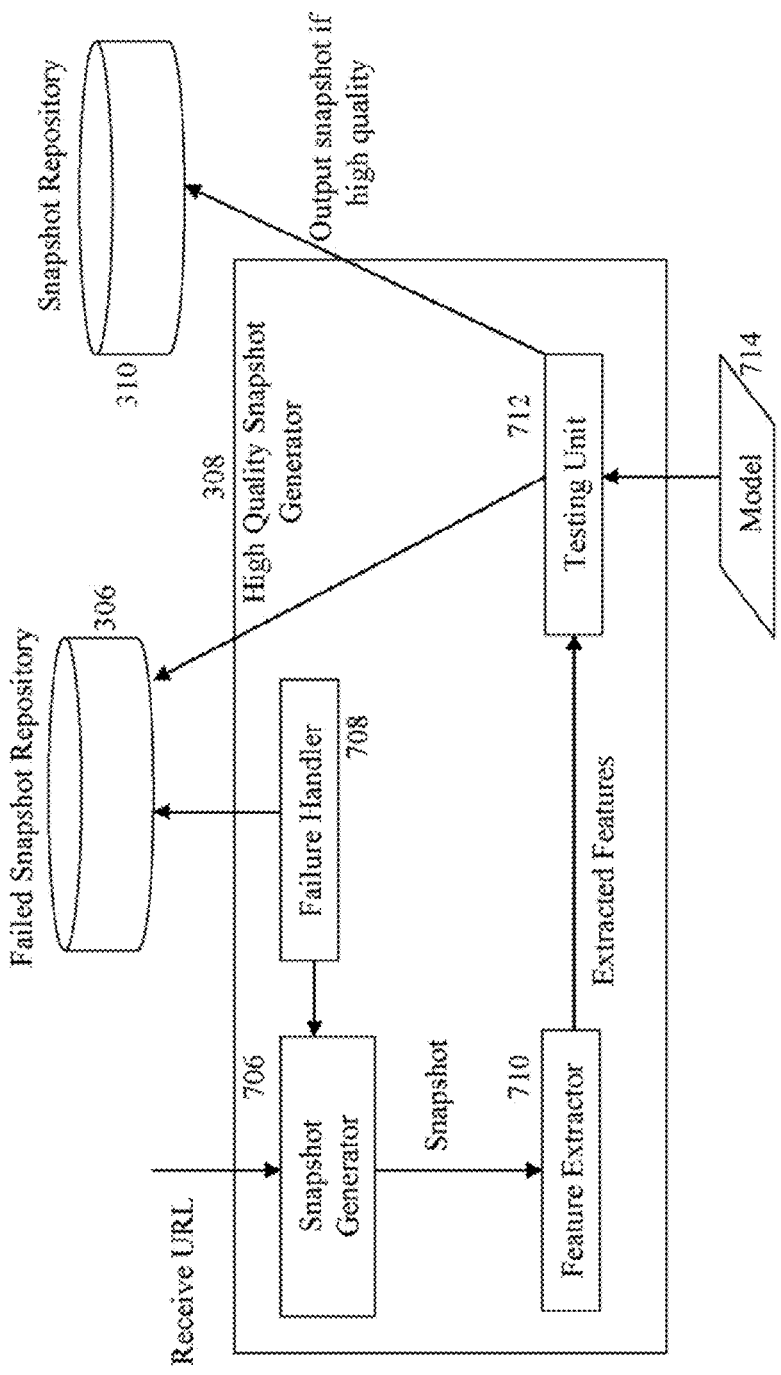
FIG. 7 depicts a high level exemplary system diagram of a high quality snapshot generator in accordance with an embodiment of the present disclosure.

FIG. 7 depicts a high level exemplary system diagram of a high quality snapshot generator in accordance with an embodiment of the present disclosure. High quality snapshot generator 308 receives the selected URLs for snapshot generation from refreshment scheduler 302. The selected web page URLs for refreshment are received by snapshot generator 706 of high quality snapshot generator 308. Snapshot generator 706 attempts to generate a snapshot for each of the web page URLs. Failure handler 708 processes web page URLs that encounter errors during snapshot generation. For example, failure handler 708 may detect that a web page URL is subject to, for example, an HTTP 404 error, HTTP 403 error, or a connection timeout. Failure handler 708 adaptively reacts to different types of errors detected. For example, when an HTTP 404 or HTTP 403 error is detected for a URL, failure handler 708 transmits an instruction to snapshot generator 706 to skip generation of a snapshot for that particular web page URL. If a connection timeout is detected, failure handler 708 may transmit an instruction to snapshot generator 706 to retry generation of a snapshot for that particular web page URL a predetermined number of times. If the snapshot still cannot be taken, failure handler 708 will instruct snapshot generator 706 to skip generation of a snapshot as well. All web page URLs that have been skipped are forwarded by failure handler 708 to failed snapshot repository 306.

All snapshots that are successfully generated by snapshot generator 706 are forwarded to feature extractor 710, where certain features of each snapshot and each web page URL associated with each snapshot are extracted. Features to be extracted for testing include web page titles, snapshot file sizes, and color distribution information of the snapshots.

All extracted features of each snapshot are forwarded to testing unit 712. Testing unit 712 uses a trained model 714 to analyze the extracted features of each snapshot and make a determination of which snapshots qualify as high quality snapshots. These high quality snapshots are output by high quality snapshot generator 308 to snapshot repository 310. Snapshot repository 310 stores the high quality snapshots so that the high quality snapshots may be retrieved and presented as search results that are both viewable and actionable.

Figure 8:
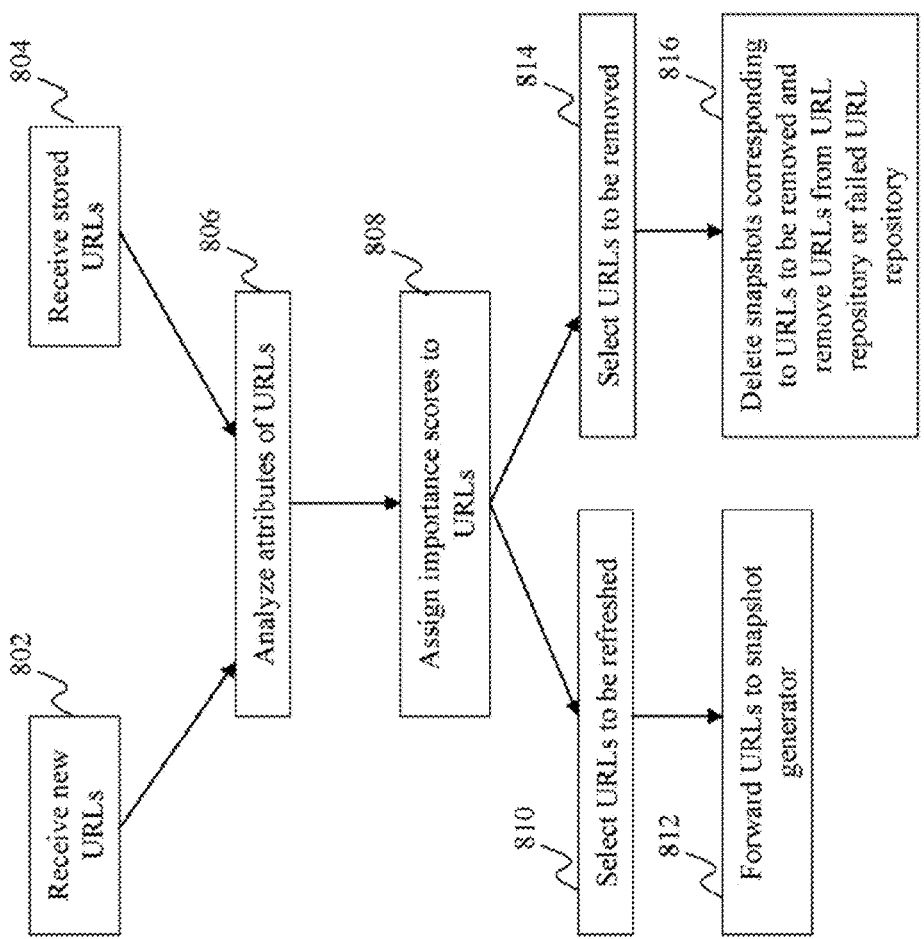
FIG. 8 depicts a flowchart of an exemplary process in which snapshots are scheduled for refreshment by refreshment scheduler in accordance with an embodiment of the present disclosure.

FIG. 8 depicts a flowchart of an exemplary process in which snapshots are scheduled for refreshment by refreshment scheduler in accordance with an embodiment of the present disclosure. At 802, new URLs are received by refreshment scheduler 302. New URLs include URLs which have not been processed previously by refreshment scheduler 302 or high quality snapshot generator 308. At 804, stored URLs are received by refreshment scheduler 302. Stored URLs include URLs which have web page snapshots associated with them and stored in snapshot repository 310 or URL repository 302. Stored URLs may also include URLs from failed URL repository 306 which either experienced failures or errors during snapshot generation, or had snapshots with low quality.

At 806, all received URLs are analyzed to determine attributes of the URLs. The attributes of the URLs include whether the URL is new, how many times a URL has been clicked or accessed, whether the URL is a recently failed URL, and whether snapshot generation was previously possible for the URL.

At 808, based on the determined attributes, an importance score is assigned to each of the URLs. The importance score serves as an indicator to determine whether or not a given URL will be selected for refreshment or snapshot generation. At 810, URLs for refreshment or snapshot generation are selected. URLs having importance scores higher than or equal to a threshold score will be selected for refreshment or snapshot generation and forwarded to high quality snapshot generator 308. At 812, these selected URLs are forwarded to high quality snapshot generator 308 to generate snapshots that may be provided as viewable and actionable search results.

At 814, URLs for removal are selected. URLs which are obsolete in search engine indexes will be removed from either URL repository 304 or failed URL repository 306. The corresponding snapshot of that URL will also be removed from snapshot repository 310. At 816, the snapshots corresponding to URLs removed from either URL repository 304 or failed URL repository 306 are deleted from snapshot repository 310 so that these snapshots will not be provided as search results.

Figure 9:
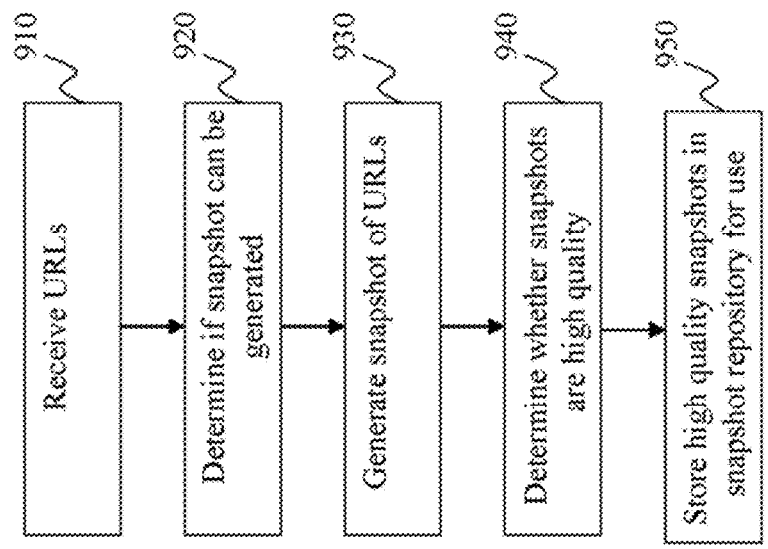
FIG. 9 depicts a flowchart of an exemplary process in which snapshots are generated by a high quality snapshot generator in accordance with an embodiment of the present disclosure.

FIG. 9 depicts a flowchart of an exemplary process in which snapshots are generated by a high quality snapshot generator in accordance with an embodiment of the present disclosure. At 910, high quality snapshot generator 308 receives URLs from refreshment scheduler 302. High quality snapshot generator 308 is configured to receive a plurality of web page URLs at periodic intervals from refreshment scheduler 302 in order to process the web page URLs. Processing the web page URLs includes generating snapshots of web pages associated with web page URLs, extracting features from those snapshots, and then determining if the snapshots are high quality to provide as search results in response to user search engine search queries.

At 920, a determination of whether a snapshot can be generated is made. Each web page URL is analyzed to determine if the web page URL is associated with an error or failure condition. The error may be, for example, an HTTP 404 error, an HTTP 403 error, or a connection timeout error. If the web page URL is associated with an error, snapshot generation may be retried a predetermined number of times. All errors are handled by failure handler 708.

At 930, a snapshot of the web pages corresponding to each URL is generated. Snapshot generator 706 generates a snapshot of the web page corresponding to the URL.

At 940, a determination of whether each snapshot is high quality is made. A plurality of features is extracted from each snapshot. Feature extractor 710 is responsible for extracting features from each snapshot. Certain features of the snapshot and the web page URL associated with the snapshot are extracted. Features to be extracted for testing include the web page title, snapshot file size, and color distribution information of the snapshot. If the web page title and the snapshot file size do not indicate an error, then the dolor distribution information of the snapshot is analyzed. In order to analyze the snapshot to extract features, the snapshot may be partitioned into a plurality of grids. Features may then be determined based on a color distribution of each of the plurality of grids. A determination is made regarding whether the snapshots are high quality snapshots based on the plurality of extracted features of the snapshots. Testing unit 712 uses trained model 714 to analyze the plurality of extracted features of the snapshots to compare with features of trained model 714 in determining whether the snapshots are high quality snapshots.

At 950, for all snapshots that are determined to be high quality snapshots, the snapshots and corresponding web page URLs are transmitted to snapshot repository 310 for storage. Snapshot repository 310 stores the high quality snapshots so that the high quality snapshots may be retrieved and presented as search results that are both viewable and actionable. If a snapshot is not determined to be a high quality snapshot, then the snapshot and web page URL are transmitted to failed URL repository 306.

The high quality snapshots may be provided as viewable and actionable links to URLs which the snapshots correspond to. This is done in response to receiving a search query from a search engine. For example, a search engine may receive a query for "faces," and thus all results or web page URLs relating to "faces," which may include the snapshots, are provided to the search engine to present to a user device. The user of the device may then view and/or activate the snapshot since the snapshot is a viewable and actionable link to a URL.

Figure 10:
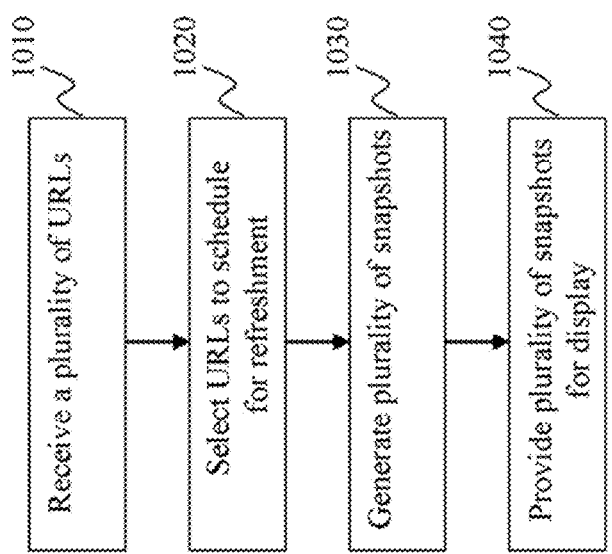
FIG. 10 depicts a flowchart of an exemplary process in which refreshed snapshots are generated in accordance with an embodiment of the present disclosure.

FIG. 10 depicts a flowchart of an exemplary process in which refreshed snapshots are provided in accordance with an embodiment of the present disclosure. At 1010, a system, search engine, or search engine backend receives a plurality of URLs. The plurality of URLs includes URLs requiring new web page snapshots corresponding to their respective URLs or a refreshment of their current web page snapshots. This includes receiving a first set of URLs stored in a URL repository such as URL repository 304 which has previously been refreshed and in current need of refreshment. This also includes receiving a second set of URLs being newly input and URLs which do not have any associated web page snapshots.

At 1020, URLs from the plurality of URLs are selected to schedule for refreshment. Typically, scheduling of snapshot refreshment or generation is handled by refreshment scheduler 302. Selecting URLs to schedule for refreshment includes analyzing attributes of each of the plurality of URLs, assigning an importance score to each of the plurality of URLs based on analyzing the attributes of each of the plurality of URLs, and selecting a set of URLs for refreshment from the plurality of URLS on the basis of the importance scores assigned to the URLs. More specifically, assigning an importance score to each of the plurality of URLs may comprise assigning high importance scores to newly added URLs, URLs that are clicked or accessed often, and URLs that have suffered from recent failures or errors. A low score may be assigned to URLs that have not been accessed often in a given timeframe.

The set of URLs scheduled for refreshment is forwarded to high quality snapshot generator 308. URLs already obsolete in search engine indices are removed from either URL repository or failed URL repository, while URLs with low importance scores are sent back to either URL repository or failed URL repository At 1030, a plurality of snapshots is generated. Snapshot generation is performed by high quality snapshot generator 308. Generation of the snapshots includes determining if the snapshots are high quality. Those snapshots that are deemed high quality may be stored in snapshot repository 310.

At 1040, the plurality of snapshots is provided for display. The plurality of snapshots may be provided for display in response to a search query received from a user device. The snapshots are provided as a part of search results corresponding to the search query. The snapshots are provided in a manner where they are both viewable and actionable by a user of the device that the snapshots are provided to. The snapshots are actionable such that based on user input or selection of the snapshot, the user is brought to the web page URL associated with the snapshot because the snapshot is linked to the web page URL.

Figure 11:
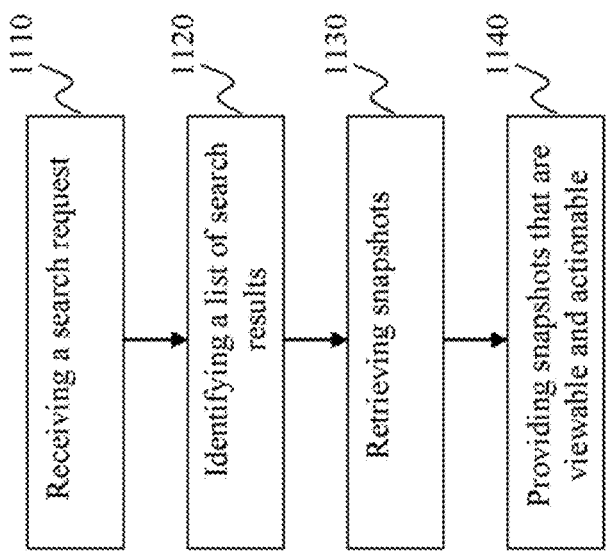
FIG. 11 depicts a flowchart of an exemplary process in which refreshed snapshots are provided in accordance with an embodiment of the present disclosure.

FIG. 11 depicts a flowchart of an exemplary process in which refreshed snapshots are provided in accordance with an embodiment of the present disclosure. At 1110, a search engine receives a search request from a user device. The search request may include user input in the form of characters, numerals, keywords, words, and phrases which can be analyzed to return search results.

At 1120, a list of search results is identified based on the received search request. The list of search results represents a list of web page URLs that have been determined to be associated with the received search request.

At 1130, snapshots corresponding to the search results are retrieved. A search engine may retrieve snapshots, for example, from snapshot repository 310. The snapshots will each be associated with one of the web page URLs that have been identified as a search result.

At 1140, the snapshots are provided are viewable and actionable links to their corresponding web page URLs. Once snapshots have been obtained, the search engine may format the snapshots for display by linking each snapshot to a web page URL that the snapshot is a picture of. These snapshots are provided to a user device that submitted the original search request. The snapshots are provided in a navigable form such that a user may easily navigate the search results that are in the form of snapshots as opposed to a traditional list of web page titles with accompanying and supporting text.

Figure 12:
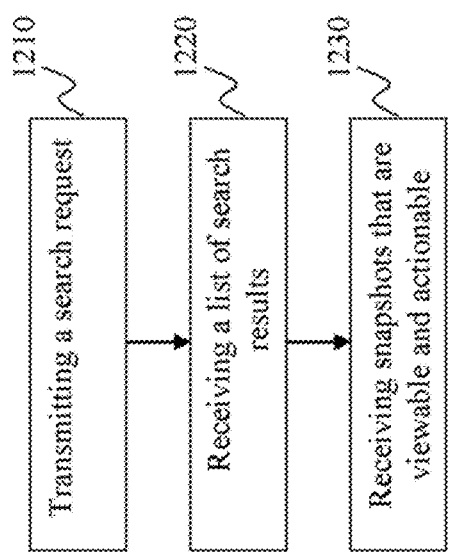
FIG. 12 depicts a flowchart of an exemplary process in which refreshed snapshots that are viewable and actionable are received by a user device in accordance with an embodiment of the present disclosure.

FIG. 12 depicts a flowchart of an exemplary process in which refreshed snapshots that are viewable and actionable are received by a user device in accordance with an embodiment of the present disclosure. At 1210, a user device transmits a search request to a search engine. The search request may be transmitted via a web browser or through a dedicated application that provides web page search results. The search engine, on the basis of the search request, will analyze the search request and provide a list of search results to the user device.

At 1220, the user device receives a list of search results. The list of search results includes web page links.

At 1230, the user device receives snapshots that are viewable and actionable. Each snapshot represents a search result that is displayable on the search result list. Each snapshot also links to a corresponding web page URL when activated by a user of the user device. The snapshots are also actionable such that they may be visually manipulated in order to navigate the list of search results.

Figure 13:
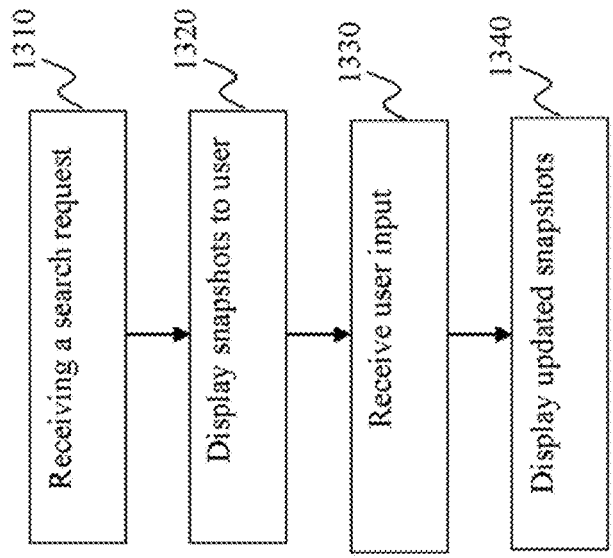
FIG. 13 depicts a flowchart of an exemplary process in which snapshots are refreshed based on input from user devices in accordance with an embodiment of the present disclosure.

FIG. 13 depicts a flowchart of an exemplary process in which snapshots are refreshed based on input from user devices in accordance with an embodiment of the present disclosure. At 1310, a user device receives a search request from a user of the device. The search request may be transmitted via a web browser or through a dedicated application that provides web page search results to a search engine. The search engine, on the basis of the search request, will analyze the search request and provide a list of search results to the user device.

At 1320, snapshots representing search results in response to the search result are displayed by the user device. The user device receives the snapshots from the search engine via a network. The snapshots are viewable and actionable, and each links to a corresponding URL. Since not all snapshots in the search results may be viewable at one time, the snapshots are actionable such that they may be manipulated by a user of the user device in order to navigate the search results.

At 1330, the user device receives user input. The user input may involve changes to the original search request. The search request may be input in the form of a search query through a search query field in a browser or application executing on the user device. Changing of the search request may cause the search results list to change.

At 1340, the user device will display updated snapshots based on the user input representing changes to the search request. Thus, the user device will receive a new list of search results including snapshots from the search engine, and display the updated snapshots as search results accordingly.

Figure 14:
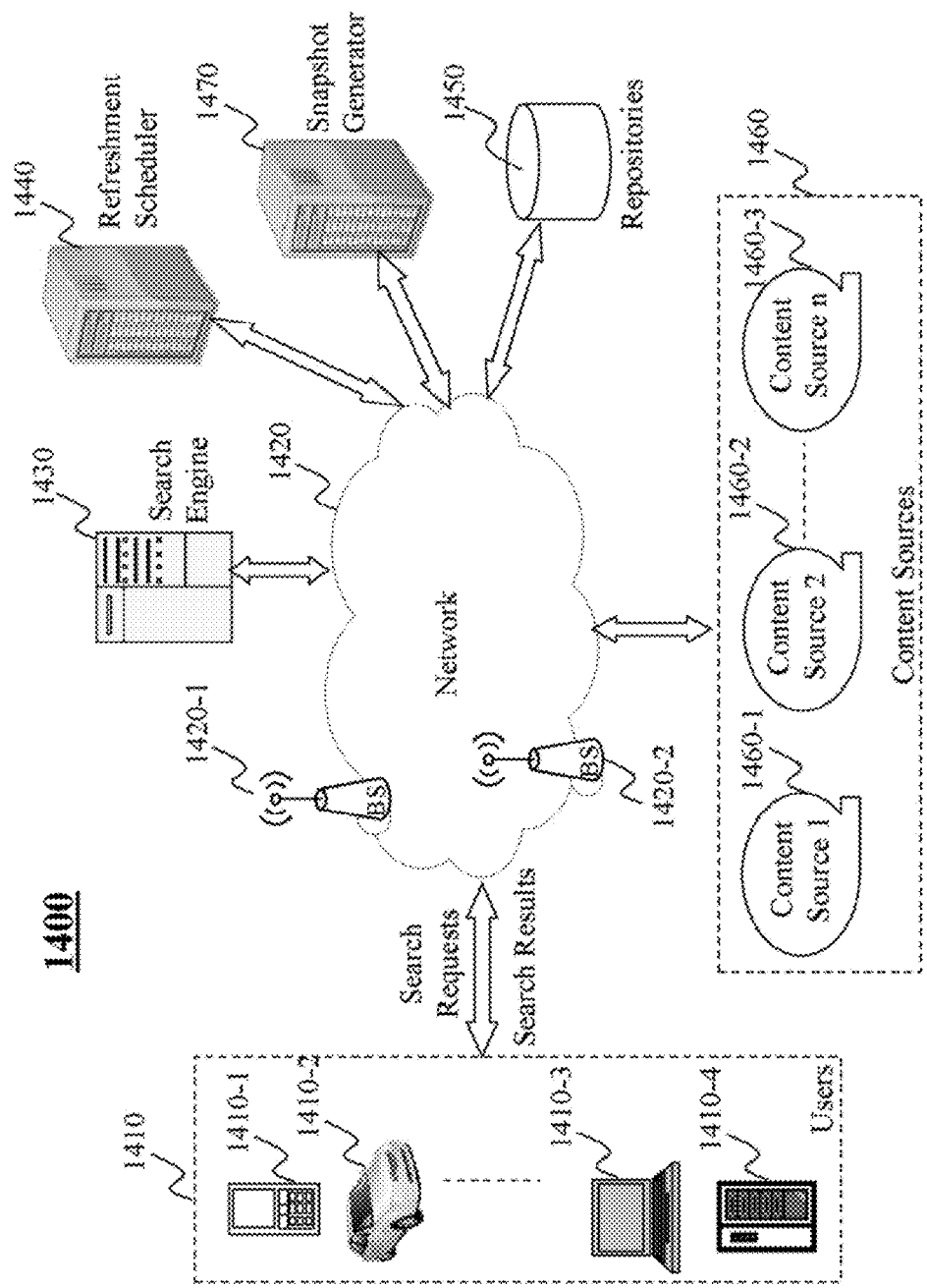
FIG. 14 is a high level depiction of an exemplary system 1400 in which a search engine and refreshment scheduler, and snapshot generator are deployed to provide refreshed high quality snapshots of web pages as search results, in accordance with an embodiment of the present disclosure.

FIG. 14 is a high level depiction of an exemplary system 1400 in which a search engine and refreshment scheduler, and snapshot generator are deployed to provide refreshed high quality snapshots of web pages as search results, in accordance with an embodiment of the present disclosure. Exemplary system 1400 includes users 1410, network 1420, search engine 1430, content sources 1460, snapshot generator 1470, refreshment scheduler 1440, and repositories 1450. Network 1420 can be a single network or a combination of different networks. For example, a network may be a local area network (LAN), a wide area network (WAN), a public network, a private network, a proprietary network, a Public Telephone Switched Network (PTSN), the Internet, a wireless network, a virtual network, or any combination thereof. A network may also include various network access points, e.g., wired or wireless access points such as base stations or Internet exchange points 1420-1, . . . , 1420-2, through which a data source may connect to in order to transmit information via the network.

Users 1410 may be of different types such as users connected to the network via desktop connections (1410-4), users connecting to the network via wireless connections such as through a laptop (1410-3), a handheld device (1410-1), or a built-in device in a motor vehicle (1410-2). A user may run applications and data provided by search engine 1430, snapshot generator 1470, refreshment scheduler 1440, or any of content sources 1460. Thus, applications and data may be provided from search engine 1430, snapshot generator 1470, refreshment scheduler 1440, or any of content sources 1460 through network 1420. Once a user is running an application on their device, the user may send instructions or search requests via the application to search engine 1430, snapshot generator 1470, refreshment scheduler 1440, or any of content sources 1460 through network 1420. The application may also independently communicate with search engine 1430, snapshot generator 1470, refreshment scheduler 1440, or any of content sources 1460 through network 1420 as needed to ensure that the application can execute properly. Users 1410 may additionally submit search requests to search engine 1430, snapshot generator 1470, and refreshment scheduler 1440 without usage of an application. Based on the search requests, search engine 1430, snapshot generator 1470, and/or refreshment scheduler 1440 may provide search results to users 1410. The search results may be presented as web page snapshots representative of web pages, the web page snapshots being viewable and actionable links to web page URLs associated with the web pages.

The content sources 1460 include multiple content sources 1460-1, 1460-2, . . . , 1460-3. A content source may correspond to a web page host corresponding to an entity, whether an individual, a business, or an organization such as the USPTO represented by USPTO.gov, a content provider such as Yahoo.com, or a content feed source such as Twitter or blog pages. It is understood that any of these content sources may be associated with search results provided to users 1410. For example, a search result may include a snapshot linking to a content source. When a user activates the snapshot, the user will then be provided with a web browser view of the web page of the content source. Search engine 1430, refreshment scheduler 1440, and snapshot generator 1470 may access information from any of content sources 1460 and rely on such information to generate web page snapshots, respond to search requests, and provide search results. Search engine 1430, refreshment scheduler 1440, and snapshot generator 1470 may also access additional information, via network 1420, stored in repositories 1450, which may contain a snapshot repository including high quality snapshots that have been generated and deemed worthy of presentation as search results, as well as a failed URL repository which lists web page URLs where snapshot generation was not possible, or where the snapshots generated did not meet a high quality threshold to be stored in snapshot repository.

In exemplary system 1400, refreshment scheduler 1440 receives URLs to schedule for snapshot refreshment or snapshot generation. URLs that are selected for snapshot refreshment or snapshot generation are transmitted to snapshot generator 1470 for snapshot generation. All snapshots generated by snapshot generator 1470 are evaluated at snapshot generator 1470. The snapshots generated by snapshot generator 1470 may be stored in repositories 1450. High quality snapshots that are stored in repositories 1450 may be used by search engine 1430 to provide these snapshots as viewable and actionable links to their corresponding web page URLs. These snapshots essentially represent search results in response to user search queries. Thus, users 1410 will only be provided with the most high quality snapshots of original web pages as search results.

Figure 15:
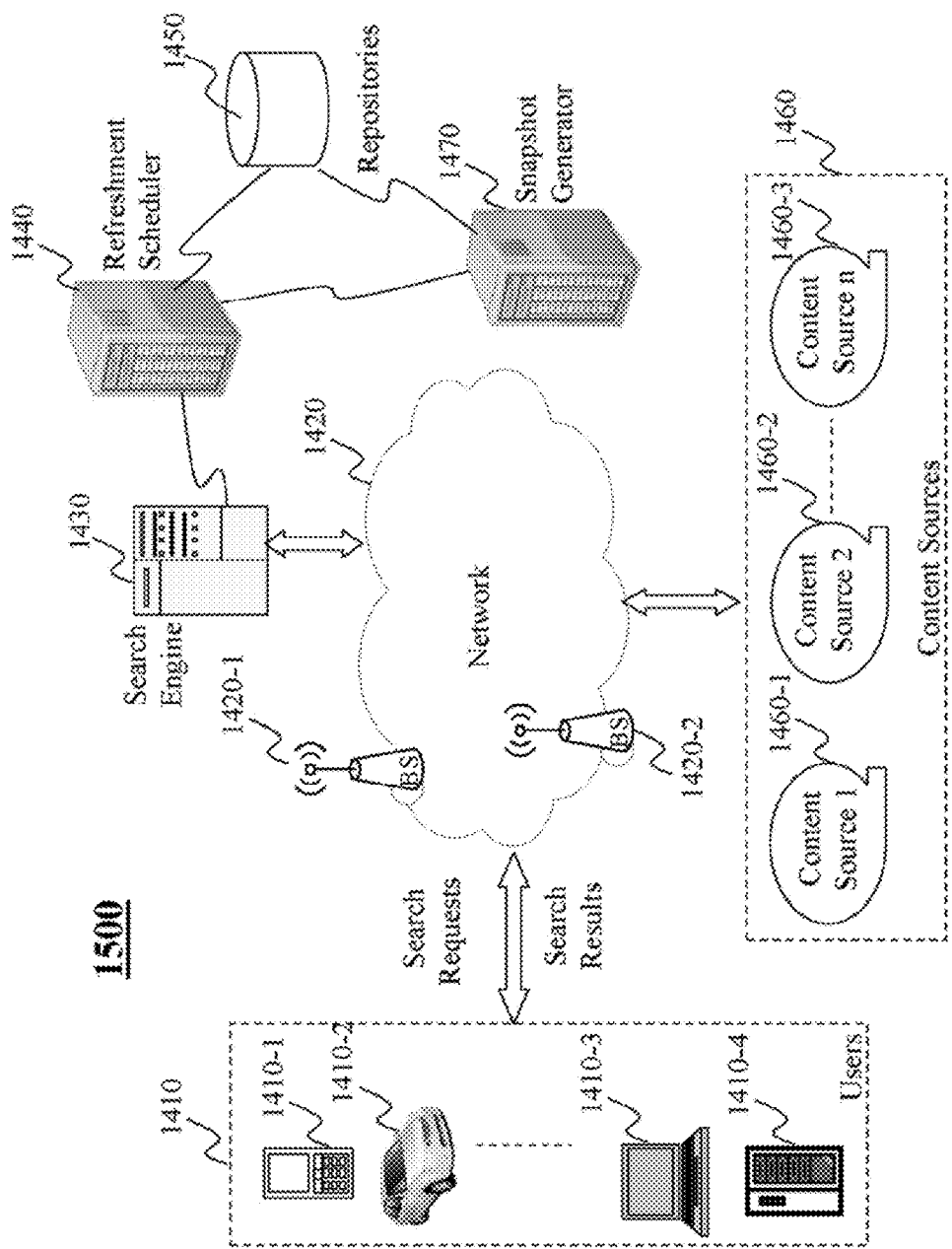
FIG. 15 is a high level depiction of an exemplary system 1500 in which a search engine and refreshment scheduler, and snapshot generator are deployed to provide refreshed high quality snapshots of web pages as search results, in accordance with an embodiment of the present disclosure.

FIG. 15 is a high level depiction of an exemplary system 1500 in which a search engine and refreshment scheduler, and snapshot generator are deployed to provide refreshed high quality snapshots of web pages as search results, in accordance with an embodiment of the present disclosure. In this embodiment, snapshot generator 1470 and refreshment scheduler 1440 serve as backend systems of search engine 1430. All communication to and from snapshot generator 1470 and refreshment scheduler 1440 are sent and received through search engine 1430.

To implement the embodiments set forth herein, computer hardware platforms may be used as hardware platform(s) for one or more of the elements described herein (e.g., search engine 1430, snapshot generator 1470, and refreshment scheduler 1440, as well as any of the components of high quality snapshot generator 308 and refreshment scheduler 302.). The hardware elements, operating systems and programming languages of such computer hardware platforms are conventional in nature, and it is presumed that those skilled in the art are adequately familiar therewith to adapt those technologies to implement any of the elements described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment, and as a result the drawings are self-explanatory.

Figure 16:
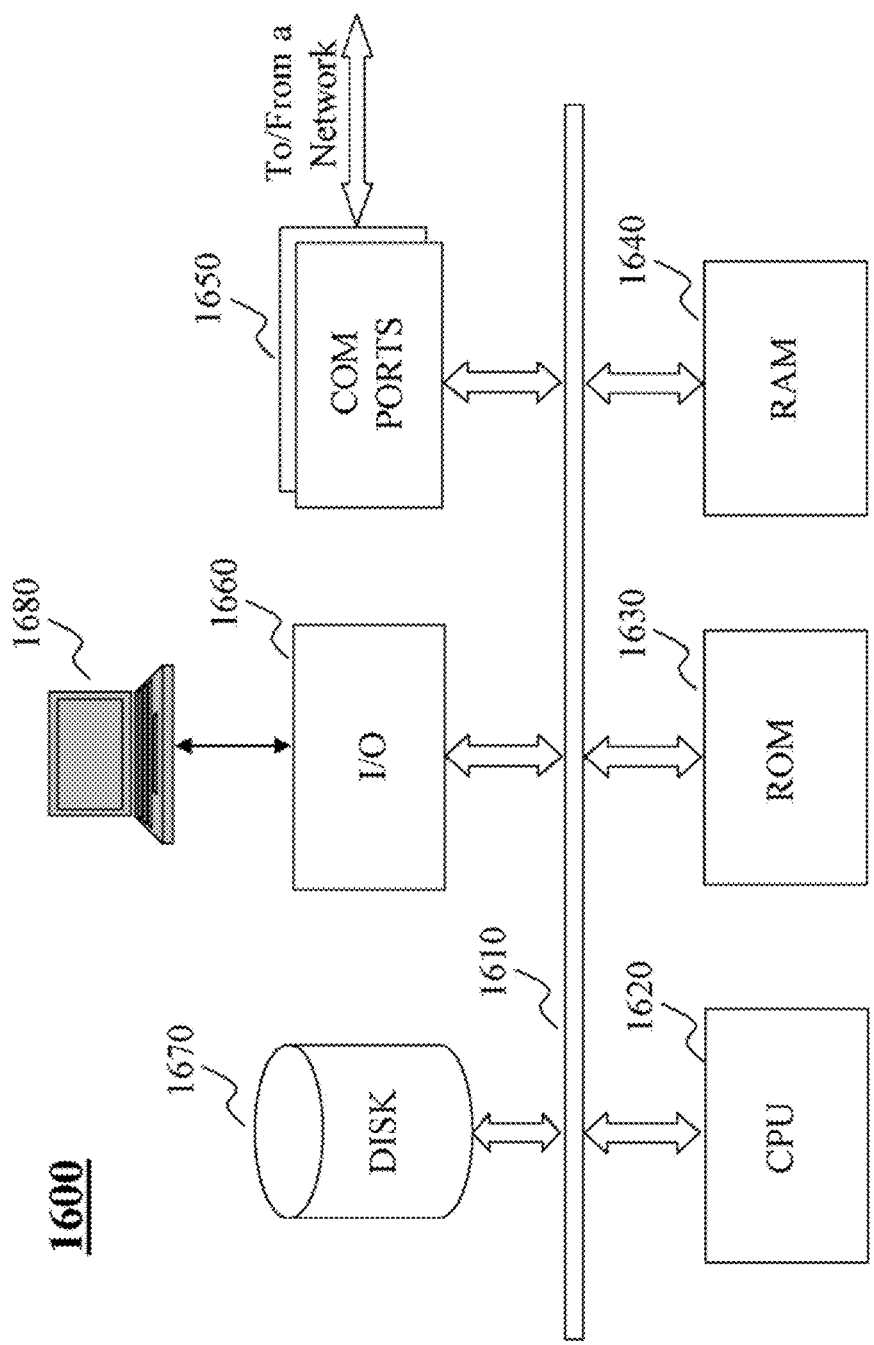
FIG. 16 depicts a general computer architecture on which the present embodiments can be implemented and has a functional block diagram illustration of a computer hardware platform which includes user interface elements.

FIG. 16 depicts a general computer architecture on which the present embodiments can be implemented and has a functional block diagram illustration of a computer hardware platform which includes user interface elements. The computer may be a general purpose computer or a special purpose computer. This computer 1600 can be used to implement any components of the development and hosting platform described herein. For example, the snapshot generator 1470 or high quality snapshot generator 308 that generates high quality snapshots of web pages, refreshment scheduler 1440 or refreshment scheduler 302 that schedules URLs for snapshot refreshment and generation, and search engine 1430 which provides viewable and actionable snapshots as search results, can all be implemented on a computer such as computer 1600, via its hardware, software program, firmware, or a combination thereof. Although only one such computer is shown, for convenience, the computer functions relating to development and hosting of applications may be implemented in a distributed fashion on a number of similar platforms, to distribute the processing load.

The computer 1600, for example, includes COM ports 1650 connected to and from a network connected thereto to facilitate data communications. The computer 1600 also includes a central processing unit (CPU) 1620, in the form of one or more processors, for executing program instructions. The exemplary computer platform includes an internal communication bus 1610, program storage and data storage of different forms, e.g., disk 1670, read only memory (ROM) 1630, or random access memory (RAM) 1640, for various data files to be processed and/or communicated by the computer, as well as possibly program instructions to be executed by the CPU. The computer 1600 also includes an I/O component 1660, supporting input/output flows between the computer and other components therein such as user interface elements 1680. The computer 1600 may also receive programming and data via network communications.

Hence, aspects of the methods of developing, deploying, and hosting applications that are interoperable across a plurality of device platforms, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated schedules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a server or host computer into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media includes dynamic memory, such as a main memory of such a computer platform. Tangible transmission media includes coaxial cables, copper wire, and fiber optics, including wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic take, any other magnetic medium, a CD-ROM, DVD or DVD-ROM, any other optical media, punch card paper tapes, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the embodiments of the present disclosure are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as firmware, a firmware/software combination, a firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim and all applications, modifications and variations that fall within the true scope of the present teachings.

The invention claimed is:

1. A method implemented on at least one computing device, each computing device having at least one processor, storage, and a communication platform connected to a network for refreshing web page URL snapshots, the method comprising:
   receiving a plurality of URLs;
   determining one or more attributes associated with each of the plurality of URLs;
   assigning an importance score to each of the plurality of URLs based on the one or more attributes associated with the URL, wherein the one or more attributes indicate whether a snapshot was previously generated successfully for the URL;
   selecting a set of URLs from the plurality of URLs for snapshot refreshment based on the corresponding importance scores;
   generating a snapshot associated with each corresponding URL of the selected set of URLs; and
   providing the snapshots for the selected set of URLs so that each snapshot is rendered as a viewable and actionable link to the corresponding URL.

2. The method of claim 1, wherein the receiving the plurality of URLs comprises:
   receiving a first set of URLs, which have associated snapshots; and
   receiving a second set of URLs, which have no associated snapshots.

3. The method of claim 1, further comprising:
   storing all URLs to the URL Repository;
   storing high quality snapshots and their associated URLs to a snapshot repository; and
   storing URLs with no snapshots or with low quality snapshots to a failed URL repository.

4. The method of claim 3, further comprising:
   deleting snapshots and their associated URLs from the snapshot repository.

5. The method of claim 1, wherein the generating the snapshot associated with each corresponding URL of the selected set of URLs, comprises:
   for each of the selected set of URLs scheduled for refreshment,
   determining if the URL is associated with a failure condition;

generating a snapshot of the URL if the URL is not associated with a failure condition;
determining whether the snapshot is a high quality snapshot; and
storing the snapshot in a snapshot repository in response to determining that the snapshot is a high quality snapshot.

6. The method of claim 5, further comprising:
storing the URL in a failed URL repository if the URL is associated with a failure condition; and
storing the URL in the failed URL repository in response to determining that its snapshot is low quality.

7. A machine readable non-transitory and tangible medium having information recorded for refreshing web page URLs, wherein the information, when read by the machine, causes the machine to perform the steps comprising:
receiving a plurality of URLs;
determining one or more attributes associated with each of the plurality of URLs;
assigning an importance score to each of the plurality of URLs based on the one or more attributes associated with the URL, wherein the one or more attributes indicate whether a snapshot was previously generated successfully for the URL;
selecting a set of URLs from the plurality of URLs for snapshot refreshment based on the corresponding importance scores;
generating a snapshot associated with each corresponding URL of the selected set of URLs; and
providing the snapshots for the selected set of URLs so that each snapshot is rendered as a viewable and actionable link to the corresponding URL.

8. The machine readable non-transitory and tangible medium of claim 7, wherein the receiving the plurality of URLs comprises:
receiving a first set of URLs, which have associated snapshots; and
receiving a second set of URLs, which have no associated snapshots.

9. The machine readable non-transitory and tangible medium of claim 7, wherein the information, when read by the machine, further causes the machine to perform the steps comprising:
storing all URLs to URL Repository;
storing high quality snapshots and their associated URLs to a snapshot repository; and
storing URLs with no snapshots or with low quality snapshots to a failed URL repository.

10. The machine readable non-transitory and tangible medium of claim 9, wherein the information, when read by the machine, further causes the machine to perform the step comprising:
deleting snapshots and their associated URLs from the snapshot repository.

11. The machine readable non-transitory and tangible medium of claim 7, wherein the generating the snapshot associated with each corresponding URL of the selected set of URLs, comprises:
for each of the selected set of URLs,
determining if the URL is associated with a failure condition;
generating a snapshot of the URL if the URL is not associated with a failure condition;
determining whether the snapshot is a high quality snapshot; and
storing the snapshot in a snapshot repository in response to determining that the snapshot is a high quality snapshot.

12. The machine readable non-transitory and tangible medium of claim 11, wherein the information, when read by the machine, further causes the machine to perform the steps comprising:
storing the URL in a failed URL repository if the URL is associated with a failure condition; and
storing the URL in the failed URL repository in response to determining that the snapshot is not a high quality snapshot.

13. A system for refreshing web page URLs, comprising:
a refreshment scheduler configured for:
determining one or more attributes associated with each of the plurality of URLs, assigning an importance score to each of the plurality of URLs based on the one or more attributes associated with the URL, wherein the one or more attributes indicate whether a snapshot was previously generated successfully for the URL, and
selecting a set of URLs from the plurality of URLs for snapshot refreshment based on the corresponding importance scores;
a snapshot generator configured for generating a snapshot associated with each corresponding URL of the selected set of URLs; and
a snapshot repository for storing and providing the snapshots for the selected set of URLs so that each snapshot is rendered as a viewable and actionable link to the corresponding URL.

14. The system of claim 13, wherein the refreshment scheduler is configured for:
receiving a first set of URLs that have associated snapshots; and
receiving a second set of URLs that do not have associated snapshots.

15. The system of claim 13, further comprising:
a URL repository for storing URLs;
a snapshot repository for storing URLs and their associated high quality snapshots; and
a failed URL repository for storing URLs with no snapshots or with low quality snapshots.

16. The system of claim 15, wherein the refreshment scheduler is further configured for deleting snapshots and their associated URLs from the snapshot repository.

17. The system of claim 13, wherein the snapshot generator is configured to:
for each of the selected URLs scheduled for refreshment, determine if the URL is associated with a failure condition;
generate a snapshot of the URL if the URL is not associated with a failure condition;
determine whether the snapshot is a high quality snapshot; and
store the snapshot in a snapshot repository in response to determining that the snapshot is a high quality snapshot.

18. A method implemented on at least one computing device, each computing device having at least one processor, storage, and a communication platform connected to a network for providing refreshed web page URL snapshots, the method comprising
receiving a search request;
identifying a list of search results corresponding to the search request;
retrieving a plurality of snapshots, wherein each snapshot is associated with a corresponding search result, and wherein the snapshots are high quality snapshots that are periodically refreshed based on importance scores, wherein each of the importance scores is assigned to a search result associated with a URL based on one or more attributes of the URL, wherein the one or more attributes indicate whether a snapshot was previously generated successfully for the URL; and providing the snapshots for the selected set of URLs such that each snapshot is rendered as a viewable and actionable link to the corresponding URL.

19. The method of claim 1, wherein the one or more attributes further indicate at least one of whether the URL is new, how many times the URL has been clicked or accessed, whether the URL has an associated snapshot, and how is quality of the associated snapshot of the URL.

* * * * *